S. LAKE.
MOTOR BOAT.
APPLICATION FILED APR. 11, 1910.
978,311.
Patented Dec. 13, 1910.
7 SHEETS—SHEET 1.
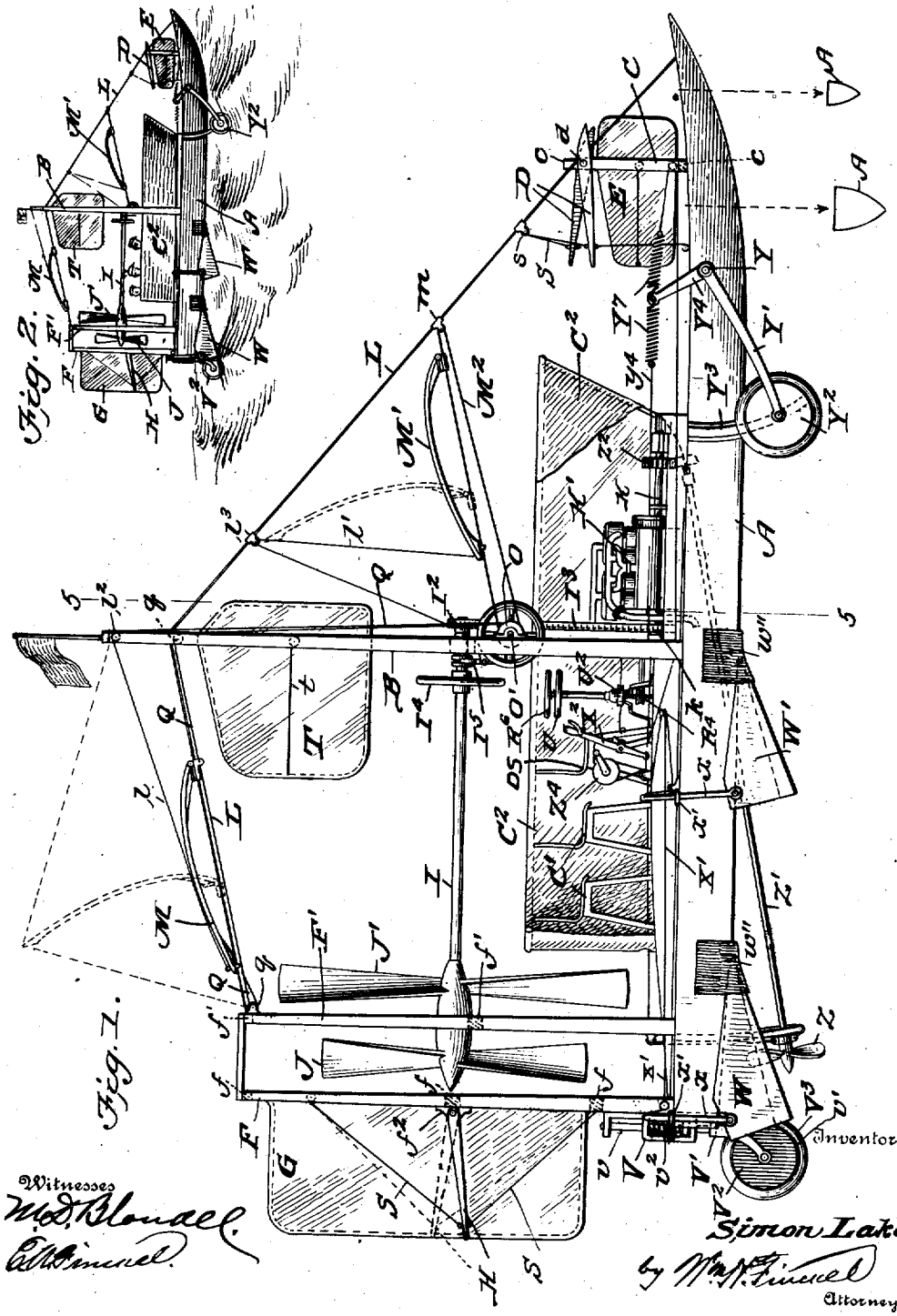
Witnesses
M. D. Blondel
E. W. Zimmel
Inventor
Simon Lake.
by Wm. H. Zimmel
Attorney

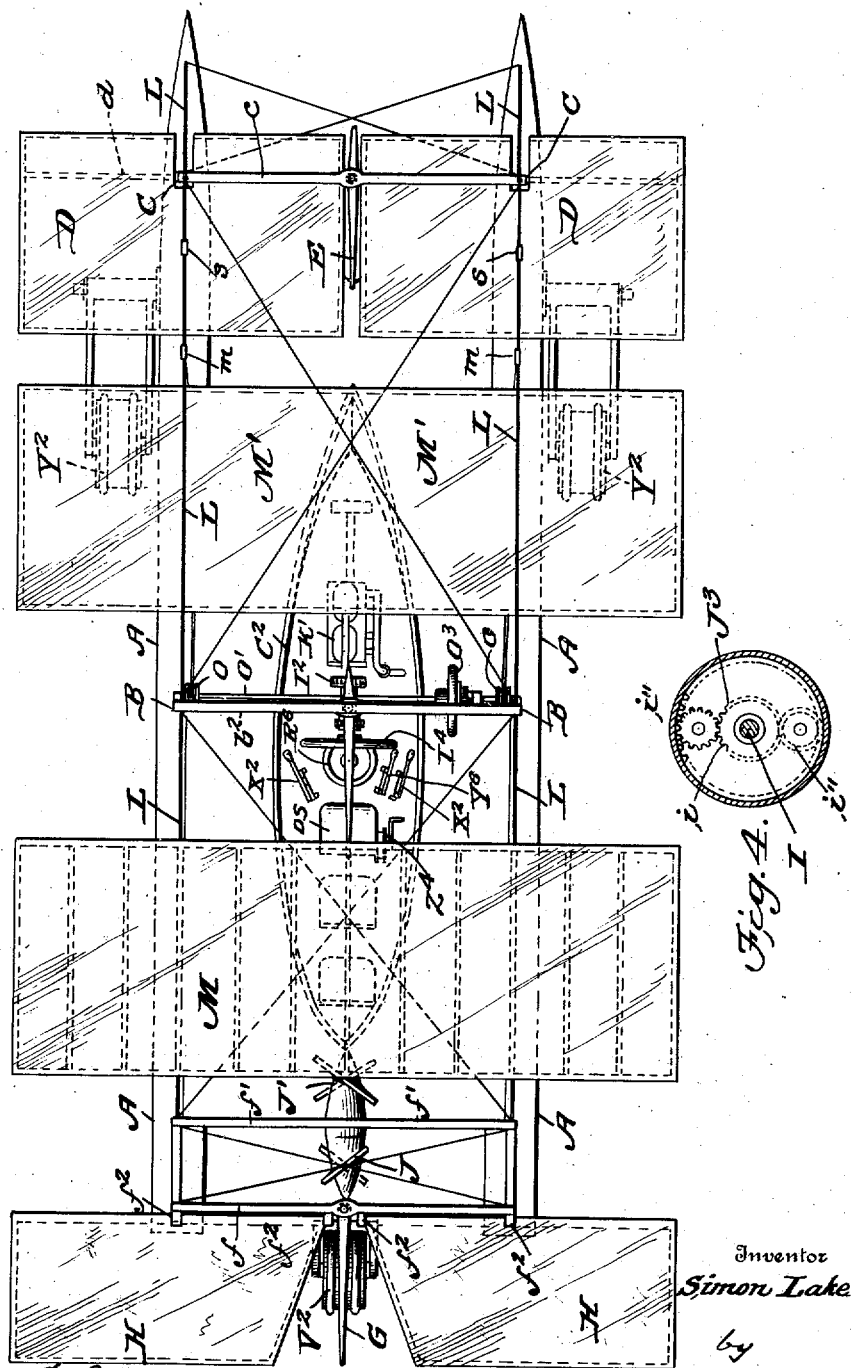

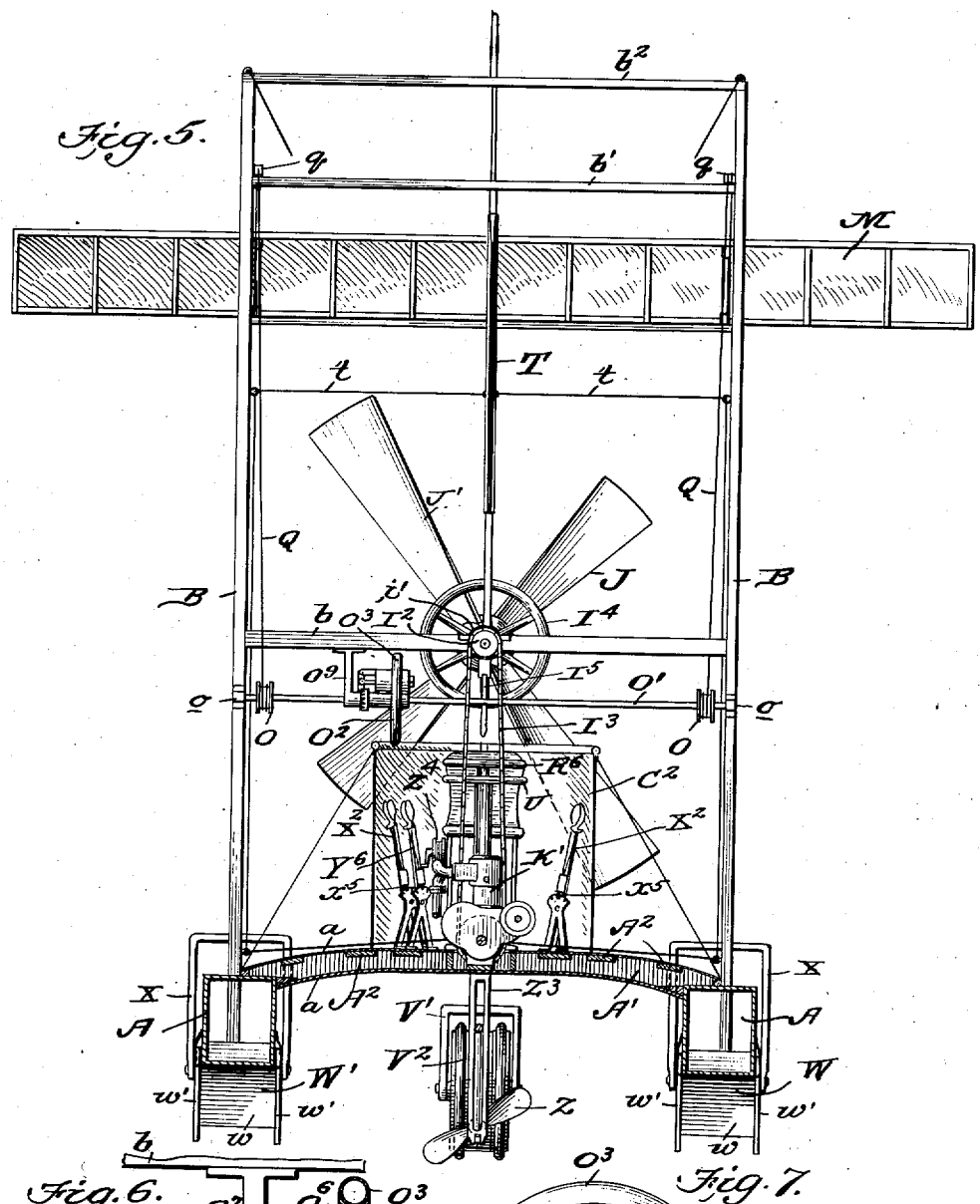
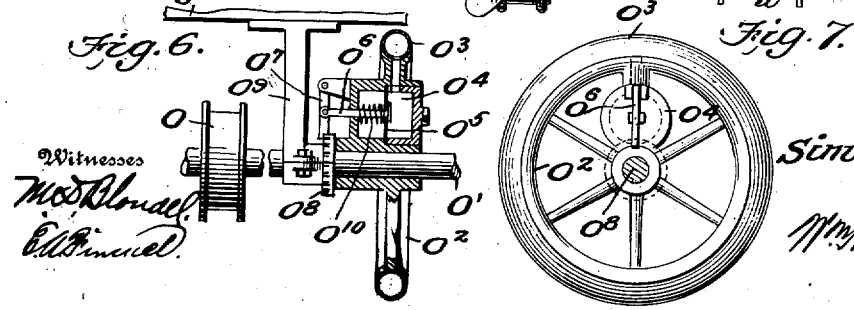

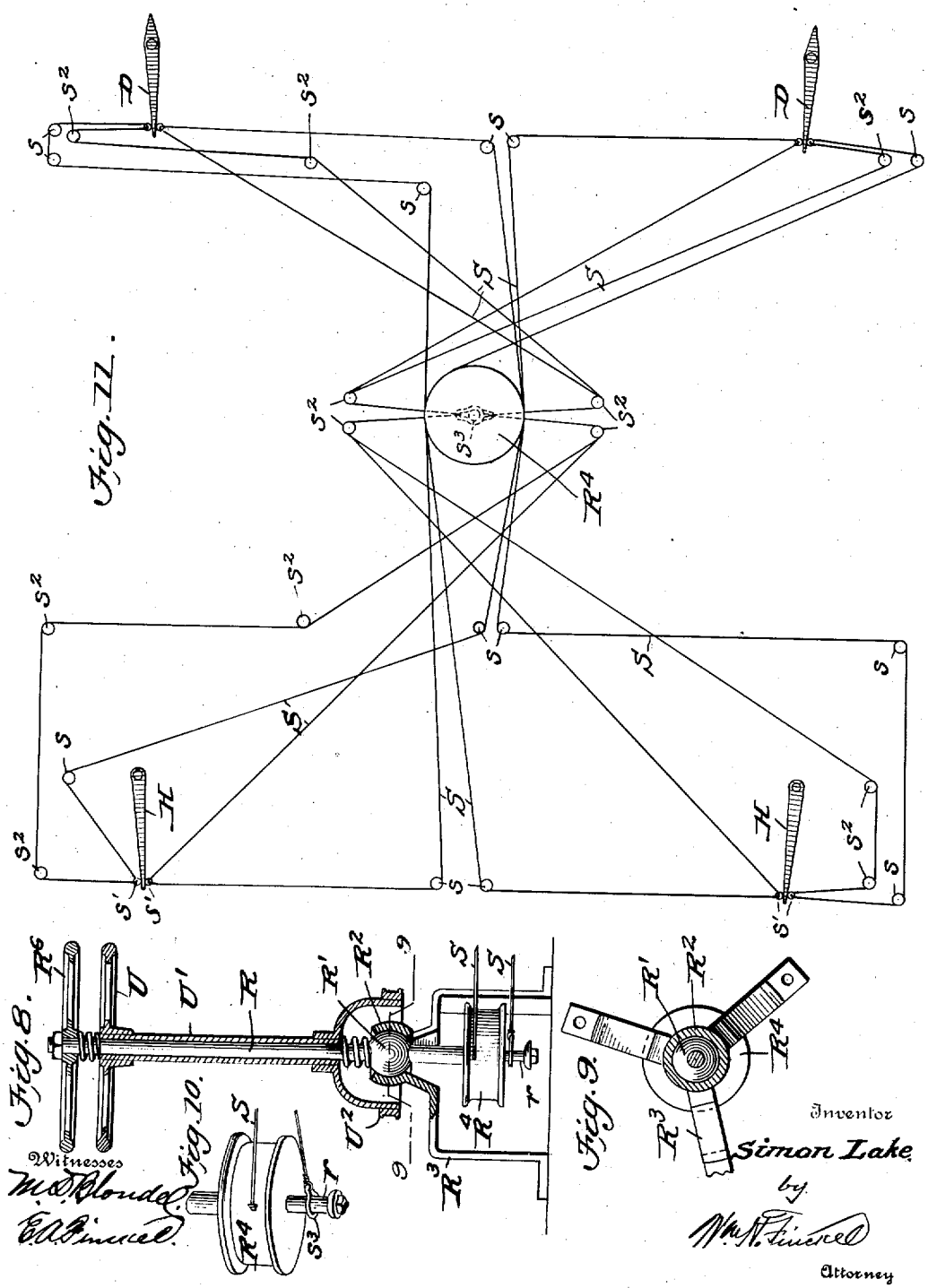

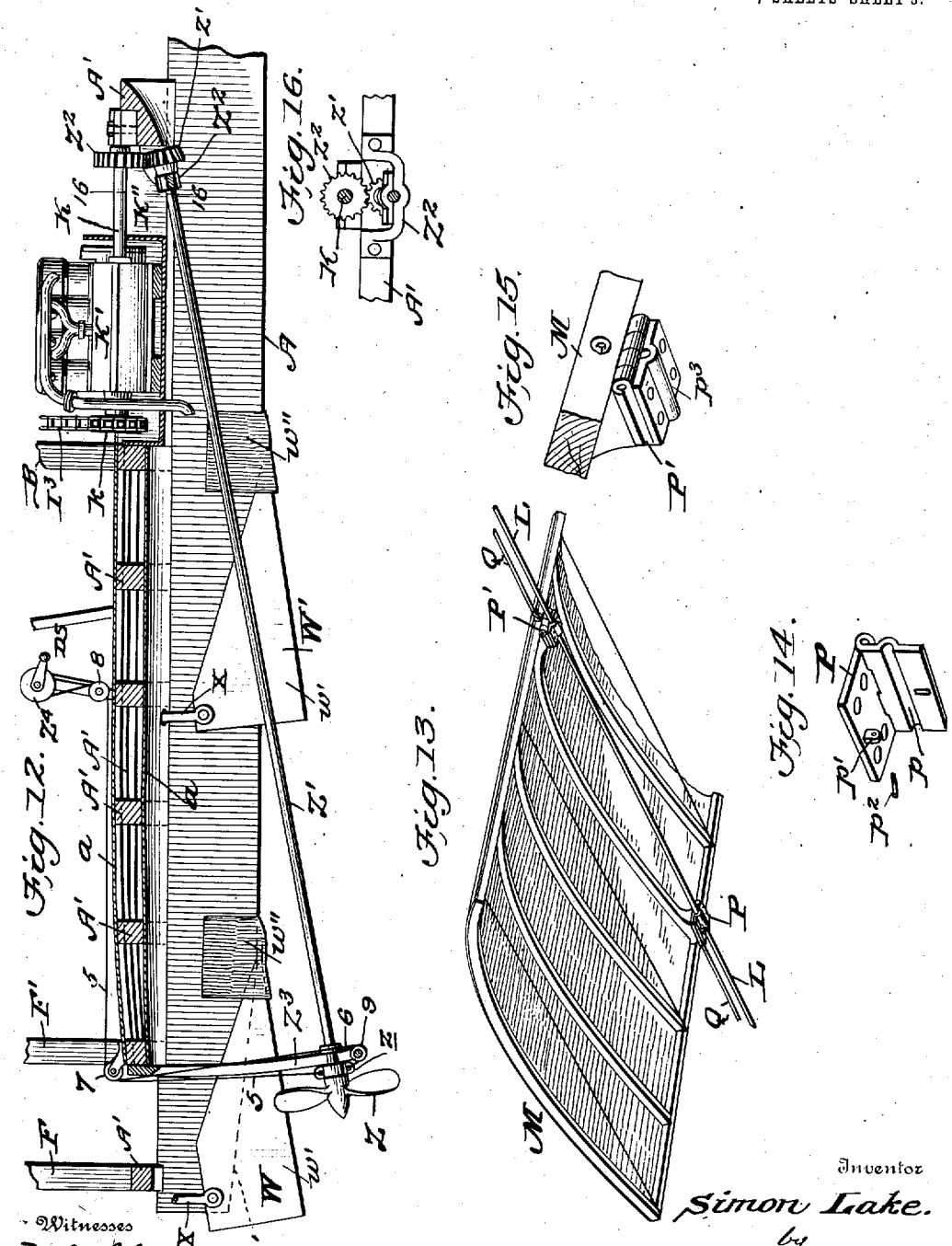

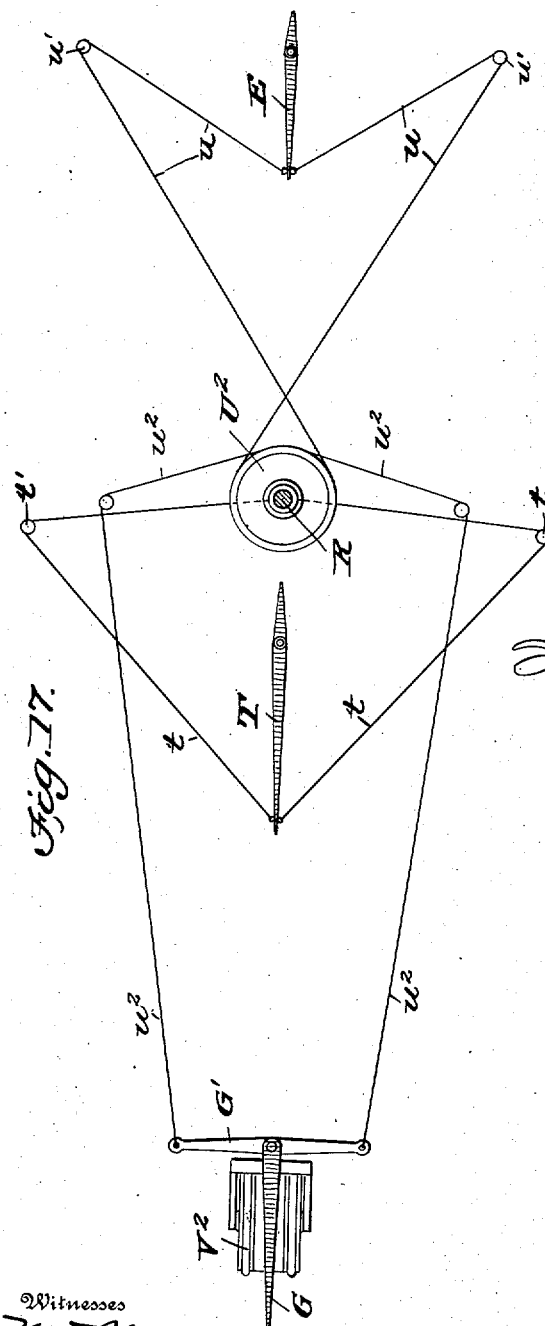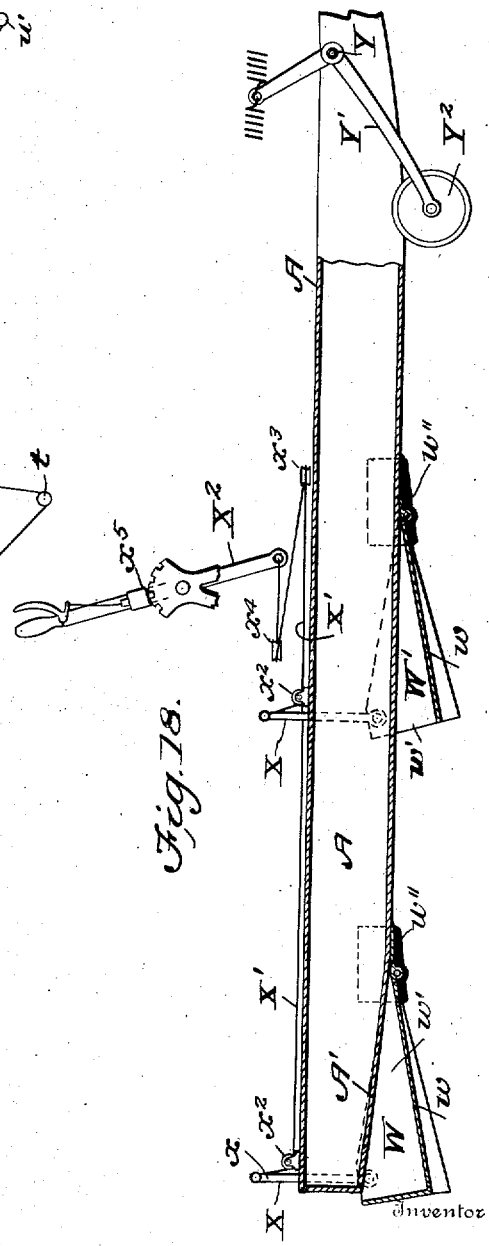

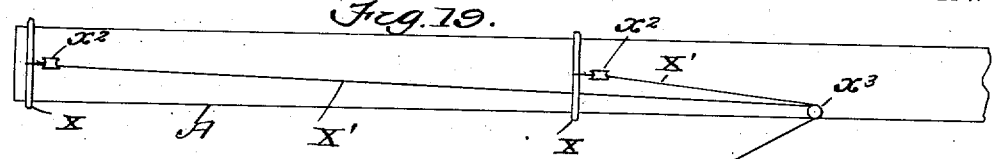
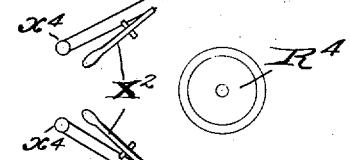
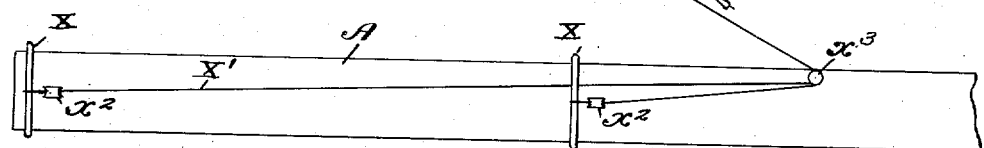
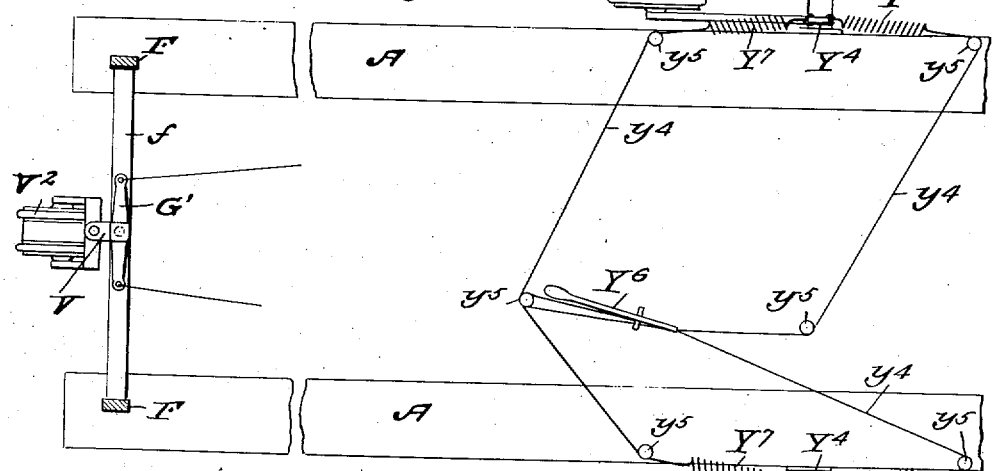
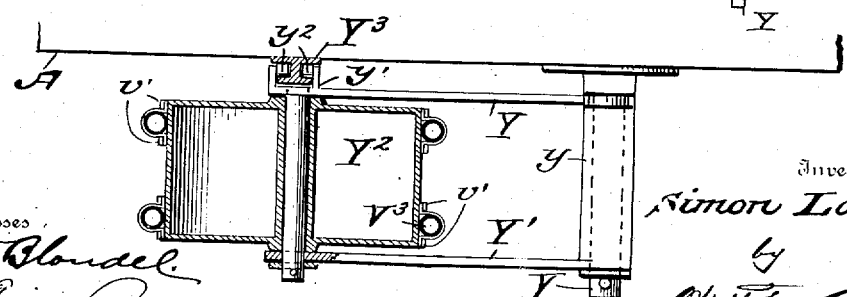

UNITED STATES PATENT OFFICE.

SIMON LAKE, OF MILFORD, CONNECTICUT.

MOTOR-BOAT.

978,311.  Specification of Letters Patent.  Patented Dec. 13, 1910.

Application filed April 11, 1910.  Serial No. 554,723.

*To all whom it may concern:*

Be it known that I, SIMON LAKE, a citizen of the United States, residing at Milford, in the county of New Haven and State of Connecticut, have invented a new and useful Motor-Boat, of which the following is a specification.

The object of this invention is to provide a motor boat especially adapted for attaining high speeds, and capable of navigating in shallow water, and to this end, the invention consists, in combination with the hull, of means for lifting the hull out of the water as the boat gains impetus and supporting it upon the surface so as to permit the hull to skim over the surface and thereby reduce the frictional contact of the hull with the water which is essential for attaining excessively high speeds.

The invention also consists in the peculiar construction, combination, arrangement and operation of the means for lifting the boat out of the water, and certain other details of construction and arrangements of parts as will be hereinafter described and claimed.

In the accompanying drawings, illustrating the invention, in the several figures of which like parts are similarly designated, Figure 1 is a side elevation of my improved motor boat. Fig. 2 is a similar view, on a reduced scale, illustrating the position of the boat when running rapidly over the surface of the water. Fig. 3 is a plan view. Fig. 4 is a transverse section drawn through the hub of the rear propeller illustrating the differential gear for operating the auxiliary propeller. Fig. 5 is a transverse vertical section of the boat drawn on a slightly larger scale on the line 5—5 of Fig. 1. Fig. 6 is a transverse section drawn through the hand wheel for operating the aeroplanes, illustrating the locking mechanism for said wheel. Fig. 7 is a side view of the wheel. Fig. 8 is a vertical sectional elevation of the universally movable shaft and its support for operating the forward and aft trimming rudders. Fig. 9 is a horizontal section of the shaft drawn on the line 9—9 of Fig. 8. Fig. 10 is a perspective view of the cable drum carried by the universally movable shaft. Fig. 11 is a diagrammatic view illustrating the attachment of the cables or cords connecting the drum of the universally movable shaft and the forward and aft trimming rudders. Fig. 12 is a longitudinal section drawn centrally through a portion of the lower section of the boat. Fig. 13 is a detail perspective view of a portion of one of the aeroplanes. Fig. 14 is a perspective view of one of the hinges employed for connecting the rear ends of the aeroplanes to their supporting cables, the hinge being shown open. Fig. 15 is a perspective view of one of the hinges arranged at the forward ends of the aeroplanes, the hinge being shown closed. Fig. 16 is a detail transverse section drawn on the line 16—16 of Fig. 12. Fig. 17 is a diagrammatic view illustrating the attachment of the cables or cords connecting the forward and aft vertical rudders and the balancing rudder, and the operating pulley to which they are connected. Fig. 18 is a diagrammatic sectional view of one of the hull sections illustrating the attachment of the lever for operating the hydroplanes. Fig. 19 is a diagrammatic plan view of the same. Fig. 20 is a diagrammatic plan view illustrating the arrangement of the cords or cables for controlling the positions of the forward buoyant wheels. Fig. 21 is a horizontal section through one of the buoyant wheels.

A designates two hull sections arranged in parallel relation which, in the present construction, are shown as hollow air-tight floats, each of which is rectangular in cross section at its stern and throughout the major portion of its length and each of which terminates at its forward end in outwardly tapering, upwardly extending bow sections of substantially inverted parabola shape in cross section and of gradually diminishing width and depth toward its extreme forward end which terminates in a point so as to cut through the water with the least possible resistance. The hull sections are connected together by cross beams A′ that in turn are connected together by longitudinal beams A² which form the deck of the boat and provide a thoroughly rigid construction. All of the beams A² and the cross beams A′ to which they are connected, are incased in a canvas or other suitable cover $a$ the lower side of which provides a lifting plane as will be hereinafter referred to.

Rising from the hulls A and from points immediately aft of their longitudinal centers, are vertical beams or main stanchions B which are connected by a centrally disposed cross beam $b$ and two top beams $b'$ and $b^2$, and adjacent to the forward ends of the hulls are shorter stanchions C in the upper ends of which are journaled a rockshaft $d$ that forms a support for two forward horizontal trimming rudders D which extend from the longitudinal center of the boat outwardly beyond the sides of the hull sections as shown most clearly in Fig. 3. The stanchions C are connected by cross beams $c$ indicated in Fig. 1, between which are held the ends of a vertical forward steering rudder E. Rising from the aft ends of the hull sections A are stanchions F and F' which are connected by cross beams $f$ and $f'$ respectively, and between the beams $f$ of the rear stanchions F is journaled a vertical aft steering rudder G while the stanchions and the cross beam $f$ form supports for journal bearings $f^2$ in which are held the ends of the journals of two rearwardly extending horizontal aft trimming rudders H which are operated by cords or cables as will be hereinafter described.

The central cross beam $f'$ of the stanchions F' forms a support for a journal bearing in which is journaled the rear end of an aerial propeller shaft I, whose forward end is journaled in a bearing $i'$ supported upon the central cross beam $b$ of the stanchions B. An aerial propeller J is mounted upon the rear end of the shaft I, the hub of which is secured to the shaft in any suitable manner, and upon the shaft I forward of the propeller J is mounted the hub of a second or auxiliary propeller J' of larger diameter than the propeller J and which is driven in the opposite direction to that of the said propeller J by a differential gear $J^3$, illustrated in Fig. 4, by reference to which it will be seen that the shaft I carries a gear $i$ which is meshed by two smaller gears $i''$ that are meshed by rack teeth formed upon the inner side of the hub of the propeller J'.

The forward end of the shaft I is provided with a sprocket wheel $I^2$ over which runs a sprocket chain $I^3$ that is driven by a sprocket wheel $k$ held upon the rear end of the shaft K of a suitable motor K' which is mounted upon and adjacent to the forward end of the platform of the boat. The motor is preferably set within a well K'' arranged in the platform as shown in Fig. 12. The shaft I carries a fly-wheel $I^4$ for starting or "cranking" the motor and is thrown into and out of gear with the shaft I by means of a clutch $I^5$ the operating handle of which is journaled in a bracket secured to the cross beam $b$ and extended downwardly to within easy reach of the operator.

L designates combined strengthening and aeroplane supporting cables which extend upwardly from the forward ends of the hulls A, over the upper ends of the stanchions C, through the main stanchions B and thence downwardly and rearwardly and have their rear ends secured to the upper ends of the stanchions F'. Slidably retained upon the lengths of the cables between the stanchions B and F' is a rear downwardly inclining elevating plane M that extends entirely across and beyond the sides of the hull sections and which is concavo-convex in longitudinal section so as to cause the impinging air currents to more effectively exert a lifting force as will be readily understood. To the sections or lengths of the cables L between the forward ends of the hulls and the main stanchions B and at points about midway of the distance between the hulls and the points of connection of the cables and stanchions B are secured brackets $m$ having guide eyelets or guide pulleys through or around which pass cables $M^2$ which also operate over and are supported by drums O carried by and at the ends of a shaft O' journaled in bearings $o$ secured to the front sides of the stanchions B. Slidably retained upon the upper strands of the cables $M^2$ is a forward elevating plane M' which as shown in Figs. 1 and 2 is arranged at substantially the same angle as but in a lower plane than the elevating plane M, and it may be stated here that the purpose of arranging the planes M and M' in a rearwardly inclining position is to throw their lower surfaces against the air currents when the boat is in motion so that the air currents will exert a lifting effect even when the boat is running on an even keel. The planes M and M' are constructed substantially alike and each is secured to its respective supporting cables at its front and rear ends by hinge brackets P and P' respectively, Figs. 13, 14 and 15, the brackets P at the rear ends of the planes having one member securely fastened to the under side of the frames of the planes and its movable member formed with a transverse groove $p$ in which its respective cable L or $M^2$ passes. Any suitable means may be employed for holding the movable members of the hinge brackets to the stationary members and for the purpose of illustration I show the stationary members provided with staples $p'$ which fit in slots of the movable members when the latter are folded against the stationary members and are held in position by pins or keys $p^2$. The brackets P' at the forward ends of the planes are secured to the undersides of the planes with their hinge or knuckle ends arranged forwardly so that the planes may be swung upwardly when the rear ends of the planes are released from their cables as illustrated by dotted lines in Fig. 1, so that the planes may be utilized as sails in the event of the motor or any part of the machinery getting out of order. The cables are held to the brackets P' by groove plates $p^3$ which are fastened to the lower sides of the movable members of the brackets.

In order to adjust the rear elevating plane forwardly or rearwardly simultaneously with the adjustment of the forward plane M', I connect the ends of operating cords or wires Q to the front and rear edges of the plane M at points adjacent to its brackets P and extend the cords or wires over suitable guide pulleys $q$ and in opposite directions around the drums O around which the supporting cables $M^2$ are supported so that as the shaft O' is revolved in one direction or the other the planes will be simultaneously moved forward or backward so as to regulate the lifting effect of the planes according to the location of the weights in the boat. In order to operate the shaft O' and to lock the shaft and likewise the planes in their adjusted position, I provide the shaft with an operating wheel $O^2$ (Figs. 5, 6 and 7), having a flexible pneumatic rim $O^3$ the space in which communicates through one of the spokes of the wheel, with a cylinder or hollow drum $O^4$ cast integral with the hub of the wheel and in which is held a flexible diaphragm $O^5$ which carries a stem $O^6$ that extends through one end of the drum and has its outer end connected to a locking lever $O^7$ that is pivoted at one end to a bracket or lug extending from the end of the drum and has its opposite end arranged to engage a rack disk $O^8$ that surrounds the shaft O' and which is securely held to the lower end of a depending arm $O^9$ carried by the cross beam $b$ of the stanchions B. By this construction it will be readily understood that as the rim of the wheel $O^2$ is grasped to revolve the shaft O' the rim $O^3$ will be compressed and the air therein forced into the end of the cylinder or drum which distends the diaphragm and pushes the stem $O^6$ outwardly which forces the lever away from the rack disk $O^8$ thus unlocking the wheel and permitting the shaft to be revolved, but the moment the grasp in the rim is released the air will rush back into the rim thus allowing the diaphragm to resume its normal position which draws the stem and lever inwardly into engagement with the rack disk thus locking the shaft and holding the elevating planes in their adjusted positions. A spring $O^{10}$ surrounds the stem $O^6$ between the diaphragm and one end of the cylinder or drum to assist the diaphragm in holding the lever into engagement with the rack disk.

To operate the forward and aft horizontal trimming rudders in order to trim the boat or to cause the rudders to act as elevating rudders and also to cause the trimming adjustments automatically, so to speak, I provide the following arrangement: In front of the driver's seat DS is mounted a vertically arranged shaft R which is provided with a spherical enlargement R' near its lower end and an operating hand wheel $R^6$ at its upper end. The spherical enlargement R' is journaled in a socket bearing $R^2$ formed at the upper end of a supporting bracket $R^3$ secured to the platform of the boat. Upon the lower end of the shaft R is mounted a drum $R^4$ to which is secured the ends of operating cords or cables S that extend in opposite directions from the drum, through suitable guides or around guide pulleys, $s$ thence through eyelets or over guide pulleys $s'$ secured to the opposite sides of the rear or free ends of the trimming rudders, thence back over suitable guides $s^2$ and have their opposite ends secured to rings $s^3$ loosely retained upon the extreme lower end of the shaft R. As illustrated in the diagrammatic view, Fig. 11, it will be noted that one end of the operating cords or cables extending from the upper and the lower sides of the aft rudders, and likewise those extending from the upper and lower sides of the forward rudders are connected to the opposite sides of the drum $R^4$ so that if the shaft is revolved in one direction all of the rudders will be raised simultaneously, whereas if the shaft is revolved in the opposite direction the rudders will be correspondingly lowered, and if the lower end of the shaft is moved forwardly both of the aft rudders will be simultaneously elevated while the forward rudders will be lowered and further if the shaft should be moved in either athwartship direction one set of rudders on one side of the boat will be lowered while the other set of the opposite side of the boat will be elevated, or vice versa. The purpose of thus providing the shaft with a universal movement so that the rudders may be operated as described may be best understood from a brief description of the operation of the boat. We will assume that the boat is running on the surface as illustrated in Fig. 2, at a very high speed with the hydroplanes, as will be hereinafter described, skimming on the surface and that the boat is on an even keel. Now should a sudden gust of wind strike either side of the boat to cause it to cant the operator through a natural disposition will incline his body toward the lifting side of the boat and in so doing he pushes the upper end of the shaft R toward the said side which throws the lower end of the shaft in the opposite direction which draws upon the cords connected to the upper sides of the trimming rudders on the lifted side of the boat so as to decrease their inclination and their lifting effect, and at the same time the rudders on the opposite side are lowered which throws their lower s faces at a greater angle to the passing air current thus increasing their lifting effect and bringing the boat to an even keel. Simultaneously with this adjustment of the trimming rudders a balancing rudder T (also to be hereinafter described) is adjusted so as to offer resistance to the wind to assist the trimming rudders in righting the boat and holding it on an even keel. Now should a gust of wind come "head on" and lift the bow of the boat, the operator, by bending his body forwardly will simultaneously draw upon the cords for elevating the rear ends of the forward trimming rudders and lowering the rear ends of the aft rudders thus decreasing the lifting effect of the forward rudders and increasing that of the aft rudders which returns the boat to an even keel in the fore and aft direction. On the other hand, should it be desired to lift the bow of the boat it will be understood that the operator reverses the fore and aft movement of the shaft R which lowers the forward rudders and elevates the aft ones. Again should it be desired to either elevate or lower both sets of rudders the operator revolves the shaft in one direction or the other as previously described. It will thus be seen that I provide an extremely simple arrangement that is controlled automatically by the operator in the movement of his body to retain his balance and which permits of the various operations irrespective of the position of the shaft R, that is to say, the shaft may be operated to adjust the port or starboard trimming rudders no matter in what position they may have been previously set by the revolution of the shaft.

In connection with the forward and aft trimming rudders for holding the boat on an even keel, I employ a central vertically arranged balancing rudder T which is journaled adjacent to its forward end between the horizontal beams $b$ and $b'$ of the main stanchions B. This balancing rudder is operated by cords or wires $t$ that extend from the opposite sides of the rear end of the rudder toward the opposite sides of the boat through suitable guides or around guide pulleys $t'$ toward the shaft R in opposite directions and are connected to the lower end $r$ of the shaft by suitable connections loosely held on the shaft. By this arrangement it will be seen that as the shaft is moved laterally for adjusting either the port or starboard trimming rudders the balancing rubber will be simultaneously turned to cause it to present a sufficient resisting surface to the wind to arrest the canting of the boat and assist the trimming rudders in holding the boat on an even keel, and it may be stated here, that the cords or cables $t$ are so arranged that the forward or aft movement of the shaft R will not effect the adjustment of the balancing rudder T, that is to say, the guides $t'$ through which the cords pass before being connected to the end of the shaft R, are positioned directly opposite the shaft in the athwartship direction and at such a distance from the said shaft so as to permit the forward and aft movement thereof without pulling upon either cord or cable $t$.

The bow and stern steering rudders E and G, are operated by a common hand wheel U that is located immediately below the hand wheel $R^6$ and which is carried at the upper end of a shaft $U'$ that is journaled upon the shaft R. The lower end of the shaft carries a drum or pulley $U^2$ which is located in horizontal alinement with the center of the pivotal point of the shaft R so that the movement of the shaft R will not materially change the location or position of the said drum or pulley $U^2$. Connected to the opposite sides at the rear end of the forward steering rudder are the ends of cords or cables $u$ which extend through suitable guides or over guide pulleys $u'$ and have their opposite ends connected to the opposite sides of the drum or pulley $U^2$, and from the forward side of the drum or pulley is connected a cord or cable $u^2$ the ends of which are extended in lateral directions through suitable guides or over guide pulleys and has its extreme ends connected to the ends of a tiller $G'$ carried by and at the lower pivotal end of the stern steering rudder G. By thus connecting the steering rudders E and G to a common operating device it will be readily understood that as the hand wheel U is turned in one direction or the other the said rudders will be correspondingly turned to direct the boat through any given course.

Secured to the journal of the steering rudder G is a bracket V that forms a support for the vertical member $v$ of a fork $V'$ in which is revolubly held a water steering wheel $V^2$. This wheel is preferably made in the form of a hollow drum with flat sides and upon its periphery adjacent to each side is securely held an elastic pneumatic tire $V^3$. These tires are designed to increase the buoyancy of the wheel when the boat is running in the water and to form a cushion wheel when running on the ground. The tires are covered with canvas covers which are securely held to the periphery of the wheel by means of metal rings $v'$. The vertical member $v$ of the fork has a vertical sliding movement in the bracket V and is retained in its lowermost position by a spring $v^2$ that surrounds the said vertical member and bears against the bracket at one end and against a collar secured to the vertical member at its opposite end as shown in Fig. 1.

The bottoms of the hull sections at their after ends are upwardly inclined as shown at $A'$ Fig. 18 and at the points where the inclined sections merge into the flat bottoms are hingedly connected the forward ends of hydroplanes W, and also at points aft of the longitudinal centers of the hull sections are arranged a forward set of hydroplanes W', the hinge connection of each hydroplane being covered with a strip of rubber $w''$ Fig. 1 that has its ends connected to the sides of the hull sections and which serve the double purpose of forming a cover for the hinges and normally holding the bottoms of the planes up against the bottoms of the hulls. The hydroplanes are constructed with bottom sections $w$ and side sections $w'$ which latter extend up along the sides of the hulls and slightly below the bottoms $w$ to form keels to prevent the lateral deflection of the hulls when the boat is running over a given course. To the rear free ends of the side sections of the hydroplanes are connected yokes X the parallel members $x$ of which are retained in guide brackets $x'$ extending from the tops of the hulls A, and to the cross members of the yokes are connected operating cords or wires X' (Figs. 18 and 19), which are extended downwardly under guide rollers $x^2$ from which they are extended forwardly along the tops of the hulls, thence around guide pulleys $x^3$ and $x^4$ and have their ends connected to operating levers $X^2$ pivoted to brackets extending upwardly from the deck of the boat, the handle ends of the levers being within easy reach of the operator. By reference to Fig. 19 it will be seen that one of these levers controls both of the hydroplanes of one hull and the other similarly controls both of the hydroplanes of the other hull. Suitable pawl and ratchets $x^5$ are employed for locking the levers in position.

Projecting from the outer side of each hull A adjacent to the forward ends of the hulls are stud bolts Y that form axles upon which are journaled the hub members $y$ of forks Y' in the rear or free ends of which are journaled hollow wheels or floats $Y^2$ similar in construction to the steering rudder wheel $V^2$, and the axles of the wheels or floats $Y^2$ are formed with heads $y'$ at their inner ends which carry antifriction rollers $y^2$ that operate in segmental guide brackets $Y^3$ secured to the outer sides of the hulls A. The hub members $y$ are formed with upwardly extending arms $Y^4$ to the upper ends of each of which are connected cables or wires $y^4$ which extend in opposite directions from the levers, around suitable guide pulleys $y^5$, and all of the cables are connected to a common operating lever $Y^6$ mounted on the platform adjacent to one of the levers $X^2$. Interposed in each cable is a spring $Y^7$ which provides an elastic connection between the arms $Y^4$ and the lever $Y^6$ to prevent a sudden jar to the boat in the event of the wheels or floats striking an obstruction and also to ease the movement of the boat in running over the ground.

Z designates a water propeller carried by a propeller shaft Z' which is journaled adjacent to its forward end in a bracket $Z^2$ extending from the forward cross beam of the platform, and at its opposite or rear end the shaft is held in a guide arm $Z^3$ depending from the cross beam or girder at the rear end of the platform. The propeller and its shaft are raised and lowered by means of cables 5 and 6 respectively, which are connected at one end to the opposite sides of a collar $z$ carried by the shaft between the hub of the propeller and the guide arm. The cable 5 is extended upwardly from the collar over a guide pulley 7 thence forwardly and around a guide pulley 8 and has its inner end connected to a drum $Z^4$ mounted at the side of the operator's chair D S, and the cable 6 is extended from the opposite side of the collar downwardly under a pulley 9 journaled to the lower end of the guide arm, from which it extends upwardly around the pulley 7, thence forwardly and under the pulley 8 and is connected to the opposite side of the drum $Z^4$ to which the cable 5 is connected, so that when the drum is turned in one direction the propeller will be lowered and when turned in the opposite direction the propeller will be elevated. A crank handle is connected to the shaft of the drum for operating the latter and a suitable pawl and ratchet is employed for locking the drum in its adjusted position. At the forward end of the shaft Z' is keyed a bevel gear $z'$ which meshes a drive gear $z^2$ carried at the forward extended end of the motor shaft K. By reference to Fig. 12 it will be readily understood that when the propeller Z is lowered into the water the forward end of the shaft Z' will be elevated which throws its gear $z'$ into mesh with the drive gear $z^2$ which drives the said propeller when the motor is set in motion, and when the propeller is elevated the gears will be disengaged and the revolution of the propeller stopped.

C' designates chairs mounted upon the platform back of the operator's chair, and $C^2$ a screen of canvas or other suitable material to protect the occupants from the wind and sprays as the boat is driven over the water.

In operation: When the boat is first started, the propeller Z is lowered into the water and the motor started to drive the boat through the water. The aero- or elevating planes M and M' are then adjusted according to the location of the center of gravity of the boat and the forward and aft trimming rudders set to what may be judged their proper position so as to avoid a sudden lifting movement as the boat gains momentum. The aerial propellers are set in motion so as to drive the boat swiftly through the water, the hydroplanes are then lowered and the trimming rudders set to a greater angle so as to lift the hull sections entirely out of the water with only the hydroplanes skimming over the surface in which position of the boat the lower side of the platform will serve as an aeroplane to help sustain the boat above the water and the wheels at the forward end will also rest lightly upon the surface as represented in Fig. 2, and thus sustain the forward end above the surface. It will be readily understood that when the hulls of the boat are thus raised out of the water the frictional contact with the water will be reduced to a minimum which accelerates the motion of the boat and permits it to attain excessively high speeds. And further by the universally movable device for adjusting the trimming rudders the latter are operated automatically with the movement of the body of the operator and the boat thus kept on an even keel.

Should any of the operating parts of the machinery get out of order and the motive power thus stopped, the elevating or lifting planes M and M' may be converted into sails by elevating their rear ends as shown in dotted lines Fig. 1, and for the purpose of elevating the planes I attach elevating cords or cables $l$ and $l'$ to their rear ends and extend them over guide pulleys $l^2$ and $l^3$ as shown, by which the planes may be elevated and the operating cords are secured to suitable cleats (not shown) arranged at any suitable place in the boat.

Suitable bracing or stay wires may be employed throughout the boat for bracing the stanchions and various parts, but for the purpose of clearness of illustration I have refrained from showing these wires as they form no part of the invention.

I desire it understood that I do not limit myself to the structural details as various changes may be made without departing from the spirit of the invention.

What I claim is:—

1. In a motor boat, the combination with the hull, of hydroplanes connected at one end to said hull, yielding connections controlling the positions of the free ends of said hydroplanes whereby said free ends may yield in coming into contact with the crest of a wave, an aeroplane arranged over said hull, trimming rudders arranged forward and aft of said aeroplane, means for controlling the positions of said trimming rudders, means for propelling, and means for steering the boat.

2. In a motor boat, the combination with the hull, of hydroplanes connected at one of their ends to the bottom of said hull and yielding connections secured to the free ends of said hydroplanes whereby said hydroplanes are free to follow the uneven surface of the water when the hull of the boat is above the surface, an aeroplane arranged over the hull, trimming rudders arranged forward and aft of said aeroplane, means for controlling the positions of said trimming rudders, means for propelling, and means for steering the boat.

3. In a motor boat, the combination with the hull, and means for propelling the boat, of hydroplanes hingedly connected to the bottom of the hull, elevating planes arranged above the hull, bow and stern trimming rudders, and means for operating the said rudders for maintaining the boat on an even keel.

4. In a motor boat, the combination with the hull, and means for propelling the boat, of hydroplanes carried by the hull, adjustable elevating planes arranged above the hull, bow and stern trimming rudders, bow and stern guiding rudders, a common means for operating said trimming rudders, as specified, and means for operating said guiding rudders.

5. In combination with a motor boat, having means for propelling same, of elevating planes for lifting the hull of the boat out of the water when in motion, trimming rudders arranged at the bow and at the stern of the boat, a balancing rudder, and a common means for operating said trimming rudders and said balancing rudder.

6. In a motor boat, means for propelling the boat, gradiently arranged elevating planes carried by the boat, gradiently arranged bow and stern trimming rudders, means for operating said trimming rudders, and a balancing rudder co-acting with said trimming rudders.

7. In a motor boat, means for propelling the boat, means for steering the boat, hydroplanes arranged below the hull of the boat, elevating planes co-acting with said hydroplanes for lifting the hull out of the water when the boat is in motion, trimming rudders arranged forward and aft of said elevating rudders, a balancing rudder, a common means for operating said trimming rudders and said balancing rudder, and means for operating said steering rudders.

8. In a motor vehicle, a body portion, means for propelling the vehicle, elevating planes arranged above the body portion, trimming rudders arranged forward and aft of said elevating planes, a balancing rudder arranged intermediate said trimming rudders, and a common means for operating said trimming rudders and the said balancing rudder in maintaining the vehicle on an even keel.

9. In a motor vehicle, a body portion, means for propelling the vehicle, elevating planes adjustably mounted above the said body portion, a trimming rudder arranged at each side of and at the forward end of said vehicle, a trimming rudder arranged at each side and at the rear end of said vehicle, and a common means operable through the movement of the body of the operator in maintaining his equilibrium when the vehicle is canted for operating the rudders to hold the vehicle on an even keel.

10. In a motor vehicle, means for propelling the same, elevating planes, a trimming rudder arranged at each side of the forward end of the vehicle, a trimming rudder arranged at each side of the rear end of the vehicle, and a common means for operating all of the said rudders, said means comprising a vertically arranged shaft having a ball and socket mounting, a hand wheel at one end and a drum adjacent to its opposite end, and cords movable through guides arranged upon each side of said rudders, said cords having one of their ends connected to said drum and their opposite ends loosely held upon the shaft adjacent to the said drum, whereby a lateral movement of the lower end of the shaft in either direction will cause the rear ends of both of the rudders on the one side of the vehicle to be raised or lowered and those on the opposite side of the vehicle to be moved in the opposite direction, and likewise a forward movement of the upper end of the shaft will raise the rear ends of the forward rudders and lower the rear ends of the rear rudders, or vice versa, and further upon revolving the said shaft in either direction the rudders will be uniformly raised or lowered, so that in the event of the operator moving his body when having hold of the hand wheel so as to maintain his equilibrium in the event of the vehicle canting while in motion, the rudders on either side of the vehicle will be automatically adjusted to trim the vehicle and retain it upon an even keel.

11. In a motor boat, a hull, means for propelling the boat through the water, elevating planes for lifting the hull out of the water when the boat is in motion, trimming rudders and means for operating them for maintaining the boat on an even keel, means for propelling the boat when the hull is elevated above the surface of the water, steering rudders, and means supported by the trimming rudder operating means for operating said steering rudders.

12. In a motor boat, a hull, means for propelling the boat through the water, elevating planes for lifting the hull of the boat out of the water when the boat is in motion, trimming rudders for maintaining the boat on an even keel, a balancing rudder coöperating with said trimming rudders, a common means for operating said trimming rudders and said balancing rudder, steering rudders, means for operating said steering rudders, and means for propelling the boat when the hull thereof is elevated above the surface of the water.

13. In a motor boat, a hull, means for propelling the boat through the water, hydroplanes connected to the bottom of the hull, elevating planes arranged over the hull, trimming rudders arranged forward and aft of said elevating planes, steering rudders arranged adjacent to said trimming rudders, means for operating said trimming rudders, means for operating said steering rudders and means for propelling the boat when the hull is elevated upon or above the surface of the water.

14. In a motor boat, a hull, means for propelling the boat, hydroplanes hingedly connected to the bottom of the hull, means for controlling the position of the hydroplanes, adjustable elevating planes arranged over the said hull, means for controlling the position of said elevating planes, trimming rudders arranged forward and aft of said elevating planes, a balancing rudder arranged intermediate said trimming rudders, a common means for operating said trimming rudders and said balancing rudder, steering rudders arranged adjacent to said trimming rudders, and means for operating said steering rudders.

15. In a motor boat, a hull, hydroplanes supported by the hull, adjacent aeroplanes arranged above the hull, means for adjusting the positions of said aeroplanes, means for automatically locking the adjusting means, trimming rudders arranged forwardly and rearwardly of the aeroplanes, steering rudders arranged adjacent to said trimming rudders, means for operating said trimming rudders, and means for operating said steering rudders, supporting wheels projecting below the hull, and means for propelling the boat.

16. A motor boat, comprising parallel hull sections, a platform arranged between said hull sections, hydroplanes arranged below and connected to said hull sections, aeroplanes arranged above the hull sections, trimming rudders arranged at the forward and at the aft ends of the floats, means for operating said trimming rudders, a water propeller adjustably mounted between the floats, aerial propellers arranged above the floats, means for operating the propellers, and means for steering the boat through a given course.

17. A motor boat, comprising parallel hull sections, a platform arranged between the hulls, hydroplanes connected to the bottoms of the hulls, aeroplanes arranged above the platform of the boat, trimming rudders arranged at the forward and at the rear end of the boat, steering rudders arranged adjacent to the trimming rudders, an aerial propeller mounted above the platform of the boat, a motor operatively connected to the shaft of the propeller, a gear wheel mounted upon the shaft of the motor, a water propeller adjustably arranged at the stern of the boat between said hull sections, a propeller shaft pivotally held adjacent to its forward end and adjacent to said gear wheel on the motor shaft and having a gear wheel at its forward end that is adapted to be thrown into engagement with the gear wheel of the motor shaft when the propeller is lowered to drive the boat through the water, and which is thrown out of engagement when said propeller is elevated, and means for raising and lowering the propeller.

18. A motor boat, comprising parallel hull sections, beams connecting the hulls, a platform supported by the beams, aeroplanes arranged above the platform, trimming rudders at the forward and at the rear end of the boat, steering rudders adjacent to the trimming rudders, means for operating the trimming rudders, means for operating the steering rudders, aerial propellers mounted above the platform at the rear end of the boat, a motor operatively connected to the shaft of the propellers, means for controlling the connection between the motor and the propeller shaft, a water propeller adjustably arranged at the rear end of the boat, a shaft supporting said water propeller, means for gearing the said water propeller shaft to the said motor substantially as specified, a rudder wheel arranged at the rear end of the boat, and buoyant wheels connected to the forward ends of the hull sections.

19. A motor boat, comprising parallel hull sections, beams connecting said hulls, a platform arranged over said beams, aeroplanes arranged over the platform, trimming rudders adjacent to the forward and at the rear end of the boat, an aerial steering rudder at the stern of the boat, a buoyant steering wheel carried by the said rudder, an aerial steering rudder arranged adjacent to the forward trimming rudders, a balancing rudder arranged above the platform and intermediate the said trimming rudders, means for operating said steering rudders and said balancing rudder, means for operating said trimming rudders, buoyant wheels carried by and adjacent to the forward ends of the said hull sections, and means for propelling the boat.

20. A motor boat, comprising parallel hull sections, means for propelling the boat, elevating planes for lifting the boat out of the water when in motion, trimming rudders for maintaining the boat on an even keel, a balancing rudder, means for operating said rudders to trim the boat and for adjusting said trimming rudders to cause them to serve as elevating planes, steering rudders, and means for operating said steering rudders.

21. A motor boat, comprising parallel hull sections, means for propelling the boat, elevating planes for lifting the hull of the boat out of the water when in motion, trimming rudders for maintaining the boat on an even keel, a balancing rudder, a universally movable shaft operatively connected to said trimming rudders and to said balancing rudder, as and for the purpose specified, steering rudders, and means carried by said shaft and independently operated for operating said steering rudders.

22. A motor boat, comprising a hull, a water propeller, elevating planes for lifting the hull of the boat out of the water when the boat is in motion, trimming rudders, means for operating the trimming rudders to maintain the boat on an even keel while the hull is out of or lightly resting upon the water, an aerial propeller arranged above the hull, a common means for operating both of the said propellers, and means for steering the boat.

In testimony whereof I have hereunto set my hand this eighth day of April, A. D. 1910.

SIMON LAKE.

Witnesses:
M. D. BLONDEL,
WM. H. SCHOLZ.

---

It is hereby certified that in Letters Patent No. 978,311, granted December 13, 1910, upon the application of Simon Lake, of Milford, Connecticut, for an improvement in "Motor-Boats," errors appear in the printed specification requiring correction as follows: Page 4, line 54, the word "rubber" should read *rudder;* page 7, line 92, the word "adjacent" should read *adjustable;* and that the said Letters Patent should be read with these corrections therein that the same may conform to the record of the case in the Patent Office.

Signed and sealed this 17th day of January, A. D., 1911.

[SEAL.]

C. C. BILLINGS,

*Acting Commissioner of Patents.* ler shaft pivotally held adjacent to its forward end and adjacent to said gear wheel on the motor shaft and having a gear wheel at its forward end that is adapted to be thrown into engagement with the gear wheel of the motor shaft when the propeller is lowered to drive the boat through the water, and which is thrown out of engagement when said propeller is elevated, and means for raising and lowering the propeller.

18. A motor boat, comprising parallel hull sections, beams connecting the hulls, a platform supported by the beams, aeroplanes arranged above the platform, trimming rudders at the forward and at the rear end of the boat, steering rudders adjacent to the trimming rudders, means for operating the trimming rudders, means for operating the steering rudders, aerial propellers mounted above the platform at the rear end of the boat, a motor operatively connected to the shaft of the propellers, means for controlling the connection between the motor and the propeller shaft, a water propeller adjustably arranged at the rear end of the boat, a shaft supporting said water propeller, means for gearing the said water propeller shaft to the said motor substantially as specified, a rudder wheel arranged at the rear end of the boat, and buoyant wheels connected to the forward ends of the hull sections.

19. A motor boat, comprising parallel hull sections, beams connecting said hulls, a platform arranged over said beams, aeroplanes arranged over the platform, trimming rudders adjacent to the forward and at the rear end of the boat, an aerial steering rudder at the stern of the boat, a buoyant steering wheel carried by the said rudder, an aerial steering rudder arranged adjacent to the forward trimming rudders, a balancing rudder arranged above the platform and intermediate the said trimming rudders, means for operating said steering rudders and said balancing rudder, means for operating said trimming rudders, buoyant wheels carried by and adjacent to the forward ends of the said hull sections, and means for propelling the boat.

20. A motor boat, comprising parallel hull sections, means for propelling the boat, elevating planes for lifting the boat out of the water when in motion, trimming rudders for maintaining the boat on an even keel, a balancing rudder, means for operating said rudders to trim the boat and for adjusting said trimming rudders to cause them to serve as elevating planes, steering rudders, and means for operating said steering rudders.

21. A motor boat, comprising parallel hull sections, means for propelling the boat, elevating planes for lifting the hull of the boat out of the water when in motion, trimming rudders for maintaining the boat on an even keel, a balancing rudder, a universally movable shaft operatively connected to said trimming rudders and to said balancing rudder, as and for the purpose specified, steering rudders, and means carried by said shaft and independently operated for operating said steering rudders.

22. A motor boat, comprising a hull, a water propeller, elevating planes for lifting the hull of the boat out of the water when the boat is in motion, trimming rudders, means for operating the trimming rudders to maintain the boat on an even keel while the hull is out of or lightly resting upon the water, an aerial propeller arranged above the hull, a common means for operating both of the said propellers, and means for steering the boat.

In testimony whereof I have hereunto set my hand this eighth day of April, A. D. 1910.

SIMON LAKE.

Witnesses:
M. D. BLONDEL,
WM. H. SCHOLZ.

---

It is hereby certified that in Letters Patent No. 978,311, granted December 13, 1910, upon the application of Simon Lake, of Milford, Connecticut, for an improvement in "Motor-Boats," errors appear in the printed specification requiring correction as follows: Page 4, line 54, the word "rubber" should read *rudder;* page 7, line 92, the word "adjacent" should read *adjustable;* and that the said Letters Patent should be read with these corrections therein that the same may conform to the record of the case in the Patent Office.

Signed and sealed this 17th day of January, A. D., 1911.

[SEAL.]

C. C. BILLINGS,
*Acting Commissioner of Patents.*

Corrections in Letters Patent No. 978,311.

It is hereby certified that in Letters Patent No. 978,311, granted December 13, 1910, upon the application of Simon Lake, of Milford, Connecticut, for an improvement in "Motor-Boats," errors appear in the printed specification requiring correction as follows: Page 4, line 54, the word "rubber" should read *rudder;* page 7, line 92, the word "adjacent" should read *adjustable;* and that the said Letters Patent should be read with these corrections therein that the same may conform to the record of the case in the Patent Office.

Signed and sealed this 17th day of January, A. D., 1911.

[SEAL.]

C. C. BILLINGS,
*Acting Commissioner of Patents.*